(12) United States Patent
Van De Dungen et al.

(10) Patent No.: US 6,471,042 B1
(45) Date of Patent: Oct. 29, 2002

(54) TRANSPORTING DEVICE FOR FOOD PRODUCTS

(75) Inventors: Wilhelmus Johannes Everardus Maria Van De Dungen, Veghel (NL); Gerardus Frederikus Jozef Leenen, Bergen (NL)

(73) Assignee: Townsend Engineering Company, Des Moines, IA (US)

( * ) Notice: Subject to any disclaimer, the term of this patent is extended or adjusted under 35 U.S.C. 154(b) by 0 days.

(21) Appl. No.: 09/508,776

(22) PCT Filed: Sep. 15, 1998

(86) PCT No.: PCT/NL98/00531

§ 371 (c)(1),
(2), (4) Date: Jul. 7, 2000

(87) PCT Pub. No.: WO99/13729

PCT Pub. Date: Mar. 25, 1999

(30) Foreign Application Priority Data

Sep. 15, 1997 (NL) .............................................. 1007039

(51) Int. Cl.[7] .............................................. B65G 17/36
(52) U.S. Cl. .................. 198/703; 198/712; 198/803.14
(58) Field of Search ................................ 198/703, 712, 198/797, 803.14

(56) References Cited

U.S. PATENT DOCUMENTS

| | | | |
|---|---|---|---|
| 3,152,358 A | | 10/1964 | Millenaar |
| 3,236,365 A | * | 2/1966 | Erisman ..................... 198/231 |
| 3,332,535 A | * | 7/1967 | Hubert ........................ 198/141 |
| 3,343,691 A | * | 9/1967 | Anderson ...................... 214/7 |
| 3,494,277 A | | 2/1970 | Olson et al. |
| 3,624,774 A | | 11/1971 | Marietta, Jr. |
| 3,687,272 A | * | 8/1972 | Eisenegger ................. 198/168 |
| 3,842,967 A | * | 10/1974 | Davis ......................... 198/140 |
| 3,946,515 A | * | 3/1976 | Fischer .......................... 46/17 |
| 4,232,782 A | * | 11/1980 | Ikeda et al. ................. 198/706 |
| 4,318,467 A | * | 3/1982 | Acton ......................... 198/703 |
| 4,674,623 A | * | 6/1987 | Tripoteau ................... 198/549 |

(List continued on next page.)

FOREIGN PATENT DOCUMENTS

| | | |
|---|---|---|
| DE | 893436 | 10/1953 |
| DE | 1023308 | 1/1958 |
| DE | 3536464 A1 | 4/1987 |
| DE | 4410391 | 9/1995 |
| EP | 0196373 | 10/1986 |
| FR | 1410053 | 12/1965 |
| FR | 2618132 | 1/1989 |
| GB | 2298404 A | 9/1996 |
| NL | 265896 | 7/1964 |
| NL | 8900871 | 11/1990 |
| NL | 8901469 | 1/1991 |
| NL | 9201307 | 2/1994 |
| WO | WO 97/18150 | 5/1997 |
| WO | WO 98/16115 | 4/1998 |

*Primary Examiner*—Donald P. Walsh
*Assistant Examiner*—Rashmi Sharma

(57) ABSTRACT

The invention relates to a transporting device for transporting food products to be processed. The transporting device includes at least one advancing element for advancing carriers of food products for processing that are fixed to the advancing element along a route extending through a processing space and a guide for guiding the carriers along at least a part of the route. The device may also include a carrier having mesh arranged on its side that extends traversely in the direction of movement and having guide elements. The device may further include two transporting devices for transporting food products for processing and a collective transfer device for coupling the two transporting devices together.

25 Claims, 9 Drawing Sheets

U.S. PATENT DOCUMENTS

| | | | | |
|---|---|---|---|---|
| 4,722,433 A | * | 2/1988 | Gough | 198/706 |
| 4,796,748 A | * | 1/1989 | Manning | 198/711 |
| 4,890,722 A | * | 1/1990 | Gough | 198/706 |
| 5,103,718 A | | 4/1992 | Schreiber et al. | |
| 5,105,933 A | * | 4/1992 | Gough | 198/706 |
| 5,186,223 A | * | 2/1993 | Rummage et al. | 141/91 |
| 5,203,124 A | * | 4/1993 | Carpenter | 51/410 |
| 5,214,999 A | * | 6/1993 | Norrie et al. | 99/330 |
| 5,339,943 A | * | 8/1994 | Baird et al. | 198/365 |
| 5,346,052 A | * | 9/1994 | Fox | 198/350 |
| 5,435,430 A | * | 7/1995 | Steiner et al. | 198/370.05 |
| 5,526,921 A | * | 6/1996 | Kovalak et al. | 198/706 |
| 5,564,878 A | * | 10/1996 | Kay | 414/141.1 |
| 6,176,369 B1 | * | 1/2001 | Petrovic | 198/867.11 |

* cited by examiner

TRANSPORTING DEVICE FOR FOOD PRODUCTS

The invention relates to a transporting device for transporting food products to be subjected to a processing, comprising at least one advancing element for advancing carriers for the food products for processing fixed to the advancing element along a route extending through a processing space.

Such transporting devices are generally known. The advancing element herein provides not only the forward movement of the carriers but also guiding of the carriers. This entails an additional mechanical load on the advancing element, for instance due to a bending moment, whereby it is more susceptible to wear. High demands are therefore made of the advancing element, whereby the possible choices of material from which the advancing element is manufactured, the type of advancing element and the dimensioning of the advancing element are limited. Such limitations often conflict with other requirements set for such devices, for instance in respect of hygiene and corrosion resistance. The invention now has for its object to provide a solution to the above stated drawbacks.

This object is achieved by such a transporting device which is provided with guide means for guiding the carriers along at least a part of the route.

As a result of these measures the advancing element will be less heavily loaded, whereby it is possible to give the advancing element a light form and to make use for instance of stainless steel and/or lubrication-free chains instead of steel and/or lubricated chains. A greater structural freedom moreover results from the separation of functions.

According to a first preferred embodiment the advancing element is endless and the route is closed. It will be apparent that herewith a continuous movement can be realized with all the resulting advantages.

In some situations it is attractive to give the route a linear form. The advancing element is then adapted to transport the carriers alternatingly in opposing directions. This results therefore in discontinuous use.

According to another preferred embodiment the guide means are adapted to take the weight of the carriers.

The forces exerted on the advancing element are hereby further decreased.

According to yet another preferred embodiment the transport apparatus comprises secondary guide means for only guiding the advancing element.

This avoids lifting of the advancing element or a less favorable positioning of the carriers, in particular with co-operation between the guide means for the carriers, and the secondary guide means for the advancing element.

According to yet another embodiment the carriers are mounted rotatably on the advancing element. This provides the option of effecting regular changes in the position of the carriers in order to prevent burning phenomena in food products.

This is preferably achieved by adapting the guide means to determine the rotation position of each of the carriers subject to the position of the carrier.

This provides the option of determining the rotation position of the carriers subject to their position, thus enabling a constant process flow.

According to yet another preferred embodiment the route extends through at least a second processing space and the first and second processing spaces are connected by a tunnel, the length of which is at least as large as the maximum distance between the carriers in the direction of movement.

According to this preferred embodiment the dimension of the tunnel in a plane transversely of the direction of movement is less than 1.5 times the dimension of the carriers, including possible products present on the carrier, in this direction.

This results in a good separation between the first and second processing spaces. This is important when different substances are being used in the first and second processing spaces and differing atmospheres prevail therein.

According to a structural embodiment the advancing element comprises at least one spring belt.

The use of a spring belt results in an attractive embodiment in respect of food products, since a spring belt requires no lubricants.

According to another embodiment the advancing means comprise at least one chain provided with hollow links, wherein each of the carriers is provided with a protruding part extending into a hollow link.

These measures result in free rotation of the carriers relative to the advancing means. The position of the carriers can herein be controlled independently of the advancing means.

According to yet another structural embodiment the carriers each comprise wire mesh on their underside and their sides extending transversely of the direction of movement.

The use of wire mesh, which is understood to mean a structure which is for a relatively greater part open whereby the carrier acquires the configuration of a basket, provides the option that the food product for processing present in the basket is easily approachable from as many sides as possible, for instance by liquids, vapours or gases, in the processing spaces. The good accessibility results in a shorter residence time in the relevant spaces and thus in a higher production speed. Another advantage of the use of a basket is that, particularly in the case of vulnerable food products, they are supported over a large part of their surface.

According to a preferred embodiment the sides extending parallel to the direction of movement comprise at least substantially closed walls.

This leads to a sturdy construction of the carrier with good potential for fixing to the advancing element.

According to yet another preferred embodiment the carriers are provided on their sides with guide elements for guiding of the carrier into a determined position by the guide supports. The guide elements can for instance be formed by guide edges arranged on the outside of the carriers.

As a consequence of this measure it is possible for the rotation position of the carrier to be determined subject to its position along the route. This provides the option for instance of allowing the carrier to variously assume different rotation positions during processing so that, depending thereon, different parts of the product present in the carrier are exposed to the processing devices.

According to another preferred embodiment the guide supports are displaceable for changing the position of the carriers.

The positions of the carrier can herewith be optimized, depending for instance on the process and/or the product.

The invention also relates to a carrier suitable for use in a transporting device as described above.

Use is preferably made for this purpose of a carrier comprising wire mesh arranged on its sides extending transversely of the direction of movement, herein the carrier is provided with guide elements. A guide edge represents a simple embodiment of such a guide element.

The use of wire mesh results in the forming of a basket with a high degree of access. It is important herein that the wire mesh be manufactured with a passage ratio greater than 65%.

The invention also relates to a carrier for food products, for instance as according to claims 17–19, comprising wire mesh for supporting the food products. In such carriers applied heretofore the accessibility of the product is limited by the contact surfaces existing between the wire mesh and the product. This can manifest itself in markings occurring on the product at that position. Such marking phenomena are now limited by making use of woven wire mesh. This advantage is not limited to a carrier as according to any of the claims 17–19.

The wire mesh is preferably manufactured from a material with a thermal conduction coefficient of a maximum of 0.25 W $K^{-1}$ $m^{-1}$.

This latter embodiment is particularly important when the processing devices subject the food product for processing, and thereby also the carrier, to a temperature treatment. If this has to act for only a short time duration, it is possible that the basket will heat up quickly and, during the subsequent process taking place at a different temperature, the product is still exposed to the previous temperature, which will result in a decrease in quality.

Plastic mesh, for instance polyester mesh, can usually be applied advantageously.

An attractive embodiment is obtained when the wire mesh is received in containers on its edges extending transversely of the direction of movement. This results in an attractive construction because sharp edges of the wire mesh are avoided and damage to the products is thus unlikely.

In preference the containers are releasably connected to the guide elements. This provides the option, in the case of possible defects such as wear, of rapid replacement of the guide elements which, as a consequence of their guide function, are susceptible to wear.

It will also be apparent that with the use of plastic walls in the carrier an attractive and inexpensive embodiment can be obtained.

The invention further relates to a guide element suitable for use with a carrier as according to claim 24.

The invention also relates to a composite transporting apparatus comprising at least two transporting devices for food products for processing, for instance as elucidated above, wherein the transporting devices are coupled by a collective transfer device.

Such a situation is applicable for instance when the products must be exposed to an aggressive environment. The processing device in which this aggressive environment prevails is therefore provided with a separate transporting device. Coupling of both transporting devices avoids the whole transporting apparatus being subjected to the aggressive environment.

Such a transfer device is preferably formed by a route of both transporting devices which extends partly parallel, wherein the guide means in the parallel routes are adapted to determine the position of the carriers so that the content of the carrier of the first transporting device is moved to a carrier of the second transporting device.

It will also be apparent that the movements of both transporting devices must herein be synchronized.

The route of both transporting devices preferably extends such that the content of the carrier is moved from the first transporting device to the second transporting device.

When the guide means are adapted to determine the rotation position of the carriers of the first transporting device and the second transporting device on the basis of the angle of arc, a gradual change of angle is obtained so that the products can be displaced from the one carrier to the other carrier without the danger of damage.

In some situations, for instance when an interposed processing device with an aggressive atmosphere is used, it is attractive that, in addition to a first transfer device for transferring the food products from the first transporting device to the second transporting device, a second transfer device be used for transferring the food products from the second transporting device to the first transporting device.

This therefore results in almost complete isolation of the second transporting device which can be fitted for transport through the aggressive environment of the products for processing.

The invention further relates to a loading device for loading a food product fed by supply means to the loading device into a carrier of a transporting device, for instance a carrier forming part of a transporting device as according to claims 1–15 or a carrier as according to claims 16–25, comprising transfer means for displacing the food product from the supply means into the carrier.

Such a device is known from DE-A-44 10 391. This patent application describes a loading device wherein sausages from a sausage manufacturing machine are fed to buffer baskets, from which the sausages drop into baskets located thereunder through rotation of the buffer baskets on their longitudinal axis. This drop entails the risk of the food product being damaged. It is moreover not possible with this device to load the sausages selectively in carriers. The invention now has for its object to obviate these drawbacks.

For this purpose the loading device is characterized in that the transfer means comprise a slide element which is drivable by drive means along a closed route and the route comprises a part wherein a food product fed by the supply means is displaced by the slide element into the carrier. The use of a slide element provides the option of causing the loading to be accompanied by a lower mechanical load on the food product.

The possibility therefore also results of allowing the loading device to operate selectively, for instance to allow passage of reject sausages or when two or more transporting devices are placed in parallel.

Use is preferably made of a loading device wherein the slide element follows a path located in a vertical plane as it follows the route.

This provides the option, if the food products are fed from a lateral direction, of moving the slide element along above the products still to be moved into the carrier after the products for processing have been moved by the slide element into the carrier, whereby a large loading capacity can be realized.

According to yet another embodiment the route comprises a substantially horizontal part wherein the slide element shifts the food product. A simple displacement of the food product is hereby obtained without excessive forces being exerted thereon, so that the chance of damage is as small as possible.

This danger is further decreased by providing the slide element with a scoop element on its bottom edge.

The measure wherein the slide element is initially accelerated and subsequently slowed during the substantially horizontal part of the route also contributes to a small chance of damage.

According to yet another preferred embodiment the slide element is connected to a driven support by means of a connection such that during a part of the route the slide element substantially covers the container of the transporting device.

This measure ensures that in the case of a product with a slightly resilient structure, rebounding and bouncing of the product out of the carrier is avoided.

This effect is improved, when the slide element comes to a standstil during the covering.

The measure that the support is connected by means of a rod assembly to a crank drivable in rotation also results in an attractive, mechanically simple embodiment.

The loading device is preferably provided with a supply device which is formed by a conveyor belt extending transversely of the transporting direction of the transporting device.

The invention also relates to a production device for producing food products, comprising a production member with an at least partially curved configuration and transporting means which are formed for instance by supply means as stated in any of the claims 32–40 which connect onto the production member. Such production devices are encountered for instance in sausage manufacture, wherein the sausages coming from the production member are fragile and it is important that they come to lie on a conveyor belt in controlled manner after manufacture, wherein they are prevented from making a free-fall by which they could be damaged. For this purpose the production member according to the invention is characterized in that the transporting means are at least partially curved together with the production member.

This is particularly the case when the production member is formed by the crimper wheel of a sausage manufacturing apparatus.

Finally, the present invention relates to a sausage manufacturing apparatus comprising a transporting device, wherein the processing device is formed by a drying device.

The second processing device is then usually formed by a smoking device.

Preferably, the sausage manufacturing apparatus comprises a bending device for bending the sausages.

This offers the possibility to make bended sausages, for instance with the shape of a horse shoe.

To emphasize the flexibility of the production the bending device is prepared for selectively bending or not bending a passing sausage.

Preferably, the sausage bending device is preceded by a positioning device for positioning the sausages. This provides in the feature that the sausages are bended in the middle, so that the shape of the sausages becomes symmetric.

The invention also concerns a processing apparatus for subjecting products, for instance food product by the processing of a fluid, the apparatus comprising carriers movable along a path, a housing through which the path extends itself and flowing means for making fluid flow through the path, in which the path of the carriers extends according to a zigzag through the housing, and in which the partial paths of the path extends substantially horizontally.

With these features it becomes possible to enhance the effectiveness of the contact between fluid and product. It is indeed easier to make the fluids flow homogeneously in a vertical direction than in a horizontal direction. The cross-like movement of the fluid like gas and product is than used optimally, so that no unused paths of the fluid flow can develop. Further, this features offers the possibility to use in parallel flow or in counter flow; the products use—besides the horizontal zigzag movement—slowly upwards or downwards.

Preferably the apparatus comprises at least two housings, and the direction of movements, perpendicular to the plain of the partial path in adjacent housings extends in opposite directions.

This avoids extra vertical movements between the housings.

The described inventions can be applied during several processes of food products, like drying, steam cooking, cooking, cooling, after drying.

Preferably, different process conditions prevail in the housings.

This enhances the flexibility of the apparatus.

Preferabely, separation means are provided between the housings.

This feature leads to a better process control. This is also valid when two different housings are used.

The present invention will be elucidated hereinbelow with reference to the annexed drawings, in which.

Figure 1:
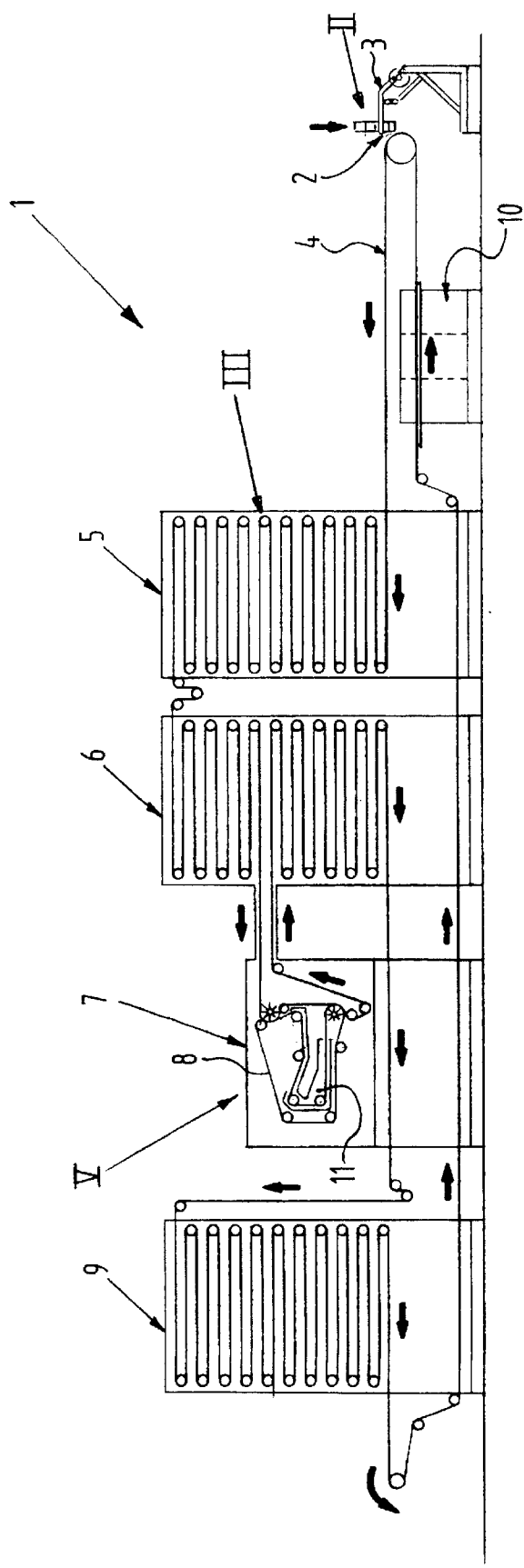
FIG. 1 shows a schematic view in longitudinal section of a device according to the invention.

In FIG. 1 is shown a sausage preparing apparatus designated in its entirety with 1. The sausage preparing apparatus comprises a co-extrusion device not shown in the drawing which is per se known. Such a co-extrusion device produces a continuous string of sausage material, the interior of which is formed by the filling or the stuffing which is provided by the co-extrusion device with a skin.

Using a so-called crimper, which will be discussed briefly below with reference to FIG. 2, this continuous string is divided into separate sausage units. These are fed onto a conveyor belt which is designated 2 in FIG. 1 and of which the direction of movement extends transversely of that of the drawing.

The sausage units are subsequently moved to a transporting device 4 using a transfer device 3. This transporting device 4 extends initially through a first processing housing 5 and then through the upper part of a second processing housing 6. The transporting device then passes through a part of a third processing housing 7 which is adapted to process the product in an aggressive environment. For this purpose this processing housing is provided with a separate transporting device 8. The transporting device then passes through the lower half of the second processing housing 7, under the third processing housing 7 and finally through a fourth processing housing 9.

The thus processed sausages are thereafter unloaded in an unloading station which is not further elucidated, whereafter the main transporting device passes through a cleaning device 10 back to the transfer device 3.

When such a device is used as device for preparing sausage, the second processing housing 6 is formed for instance by a housing in which a different or the same temperature prevails, for instance due to the presence of heating elements or by supplying heated gases to this housing. A further drying of the sausages takes place here.

In the third processing housing 7 the sausages for processing are subjected to a taste-improving environment; they are herein treated for instance with smoke liquid. This liquid is generally quite aggressive, so that a separate space 11 is created for this purpose. In order to prevent contamination of the main transporting device use is made herein of a second transporting device which extends only inside this third processing housing. The aggressiveness and contamination of space 11 therefore affect only this second transporting device, so that the main transporting device is protected.

The product is subsequently subjected to the lower half of the second processing housing 6 in which the drying process is completed.

Finally, a further cooking or cooling process takes place in the fourth processing housing 9.

It will be apparent that this total apparatus can be modified in accordance with the nature of the product for processing. The above stated embodiment relates to the processing of sausages, for instance frankfurters; it is however quite possible for such a processing apparatus to be used for the processing of other products, such as other types of sausage or other meat products such as hamburgers and the like. The invention is not however limited to applications in the meat sector; such an apparatus can also be used in for instance the preparation of vegetable preserves.

Figure 2:
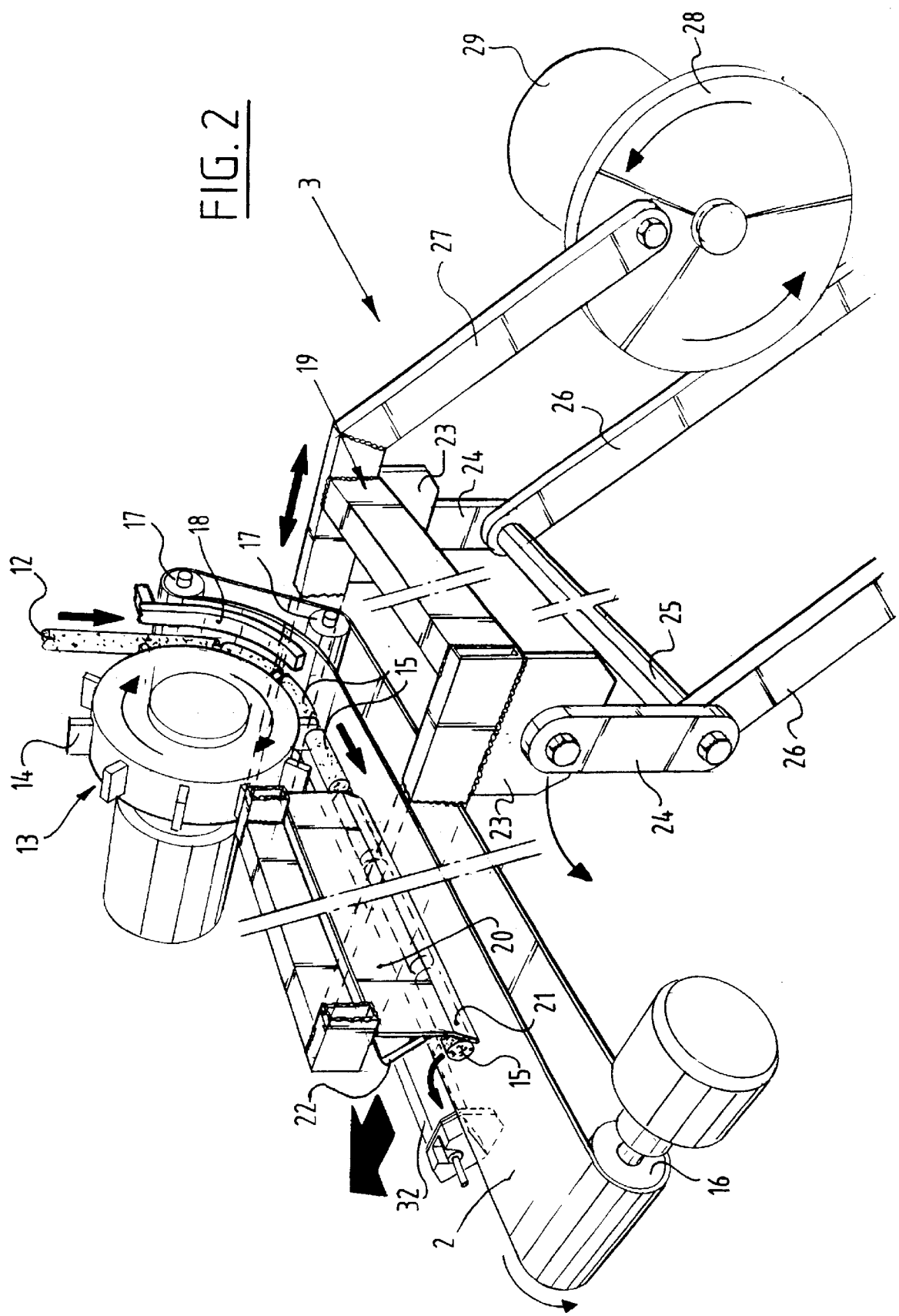
FIG. 2 shows a partly broken away perspective detail view along arrow II in FIG. 1.

FIG. 2 shows a sausage string from a co-extrusion mechanism which is not shown in the drawing. In the present embodiment this is supplied from above in vertical direction; it is equally possible for it to be supplied from another side in order to have available a larger circle segment for processing by the so-called crimper wheel 13.

This crimper wheel 13 is provided on its periphery with crimping elements 14 which engage on and clamp the sausage string and bind together the casing of the sausage string at the position of the clamping and then cut the thus formed sausages 15 free of each other.

Arranged under crimper wheel 13 is the transverse conveyor belt 2 which extends under crimper wheel 13 to make contact with the protrusions 14 thereof and with the separate sausages 15 to be formed therebetween. The transverse conveyor belt 2 is guided for this purpose not only along a driving roller 16 but also along two guide rollers 17. Use is further made of a guide strip 18. As a result the conveyor belt 2 is guided closely along the wheel. It is also possible to place conveyor belt 2 a short distance from the wheel. What is essential is that as soon as the separate sausages 15 are released they come to lie on conveyor belt 2 without danger of damage and at the same mutual distance. If conveyor belt 2 were to extend straight they would fall through a relatively great distance, whereby the fragile sausages could be damaged.

A part of transverse conveyor belt 2 further extends substantially horizontally. As elucidated with reference to FIG. 1, the main transporting device 4 connects onto this part of transverse conveyor belt 2.

In order to switch the sausages 15, use is made of a transfer device 3 which will be described hereinbelow. In the present embodiment the transfer device 3 is suitable for transferring three sausages at a time into the main transporting direction. It will be apparent that, also depending on the length of the sausages, another variable may be suitable for transferring other numbers of sausages. More than one main transporting device can moreover be connected to the transverse conveyor belt depending on the production capacity of the devices leading to or from the transfer machine. The control of the transfer device is herein such that it switches for instance only one of each three or two sausages to the main transporting device.

As shown in FIG. 2, the actual transfer device of claim 1 comprises a frame 19 to which is fixed a slide element 20. The underside of slide element 20 is provided with an obliquely extending scope part 21. This scoop part 21 ensures not only a sliding but also a slightly scooping action of the transfer device, which is important so as not to damage the fragile sausages.

In order to prevent that when sausages 15 are placed in the containers or baskets forming part of the main apparatus the sausages 15 bounce out of the relevant containers again as a result of elasticity, a resiliently arranged cover element 22 is arranged on slide element 20.

The frame 19, which is substantially rectangular, is provided on its underside with ears 23 which are each rotatably connected to a lever 24. Both levers 24 are connected to a support frame 26 for rotation on a common shaft 25. For driving thereof the frame 19 is connected by means of two rods 27, only one of which is shown in the drawing, to an element which is driven in rotation, for instance a disc 28 which is drivable by an electric motor 29.

By driving disc 28 in rotation the frame will execute a movement such that slide element 20 performs a movement extending in a vertical plane along a closed route wherein, when electric motor 29 is driven continuously, slide element 20 is in continuous movement, albeit always at a different speed. The movement is such that while passing through a lower part the moving sausages 15 extending in substantially flat position are pushed into the transporting element in substantially horizontal direction, whereafter the slide element moves upward, then moves back over the new sausages meanwhile supplied via conveyor belt 2 and moves downward again on the other side, whereafter this movement is repeated.

It must certainly not be inferred however from the foregoing description that this is a rectangular movement; it is rather a movement of which only the lower part is substantially flat and wherein all other directional components transpose gradually into each other.

Figure 3:
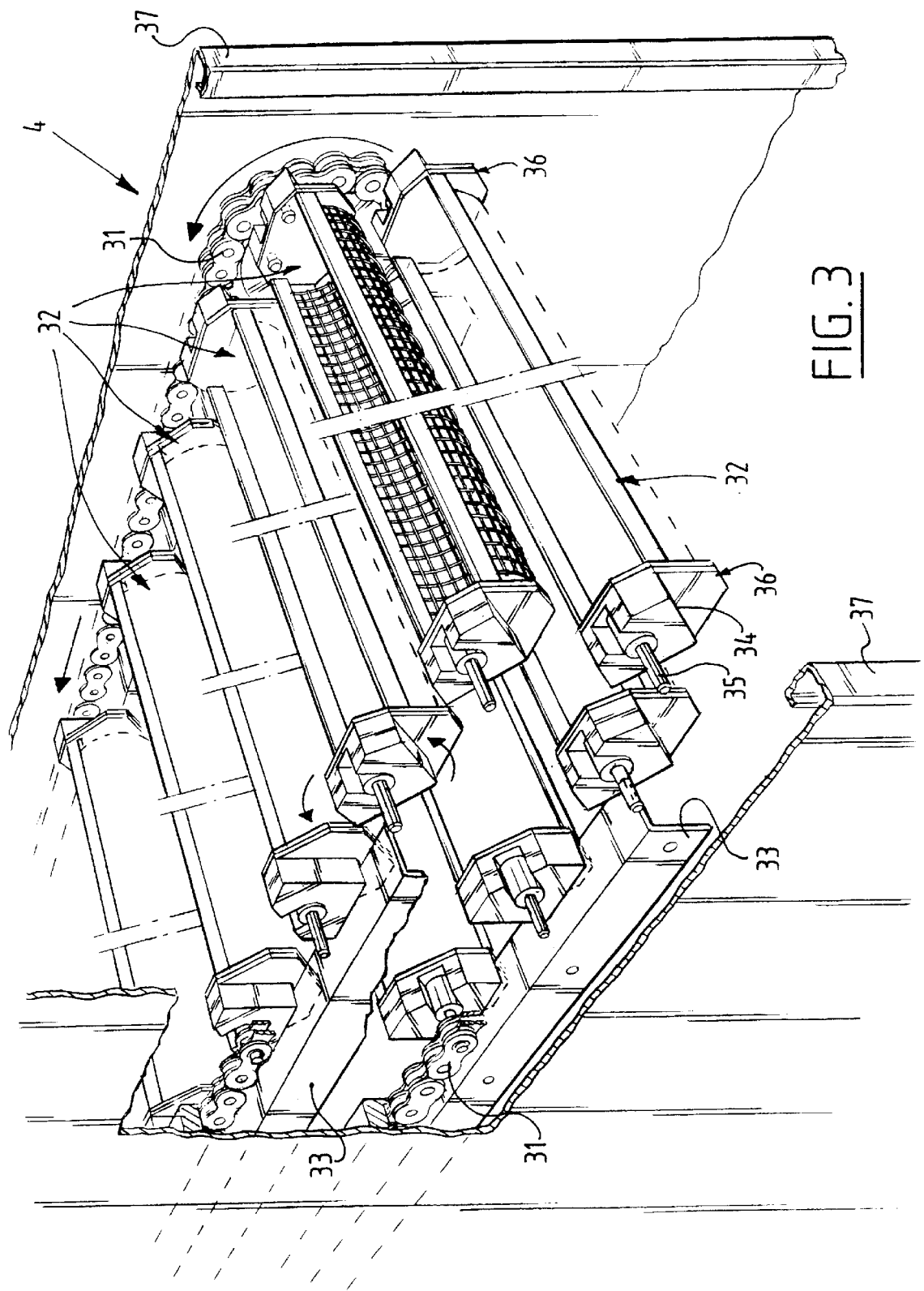
FIG. 3 shows a partly broken away perspective detail view along arrow III in FIG. 1.

The actual main transporting device is shown in more detail in FIG. 3. The main transporting device is formed essentially by an advancing element in the form of a chain 31 and carriers 32 fixed to chain 31 and guide means which are formed by fixedly arranged guide means in the form of guide rails 33 and guide edges 34 arranged on carriers 32. Instead of a chain 31 it is possible to apply other flexible advancing elements, for instance a spring belt. Chain 31 is provided with openings extending at regular distances into which can be placed pins 35 mounted on carriers 32. It is thus possible by means of the advancing element in the form of chain 31 to advance carriers 32 by means of the pins.

The pins and the holes arranged in the chain are such that the carriers can rotate on an axis extending transversely of the direction of movement. If no further measures are thus taken, the rotation position of the carriers will be determined by the force of gravity. However, the guide means have taken over this function of determining the rotation position of the carrier. The guide means are formed by the fixedly arranged guide rails 33 and edges 34 arranged on the side surfaces 36 of the carriers. The rotation position of each of the carriers 32 can be determined by causing the edges to be guided by the guide rails 33.

It will be apparent that carriers 32 are not limited to the embodiment shown here; they make take other forms, in particular they can be provided with other rise edges and the like for determining therewith the position of the carriers. It is further noted that the guide means not only have the function of determining the rotation position of the carriers but also to take over at least a part of the weight of the carriers and the content thereof, so that the advancing element, in this case the chain, is not loaded with this weight. It will be apparent that it is possible to apply other forms of guide means arranged on the carriers, for instance pins or blocks.

Above the chain 31 often a strip has been provided to avoid climbing of the chain or of the carriers, for instance in the case of pollution of the rail 33.

The same effect can besides be obtained by providing a similar rail above the fitting plates 38.

It is finally noted that the transporting device 4 in FIG. 3 is shown to be arranged in a housing, the walls of which are designated 37.

Figure 4:
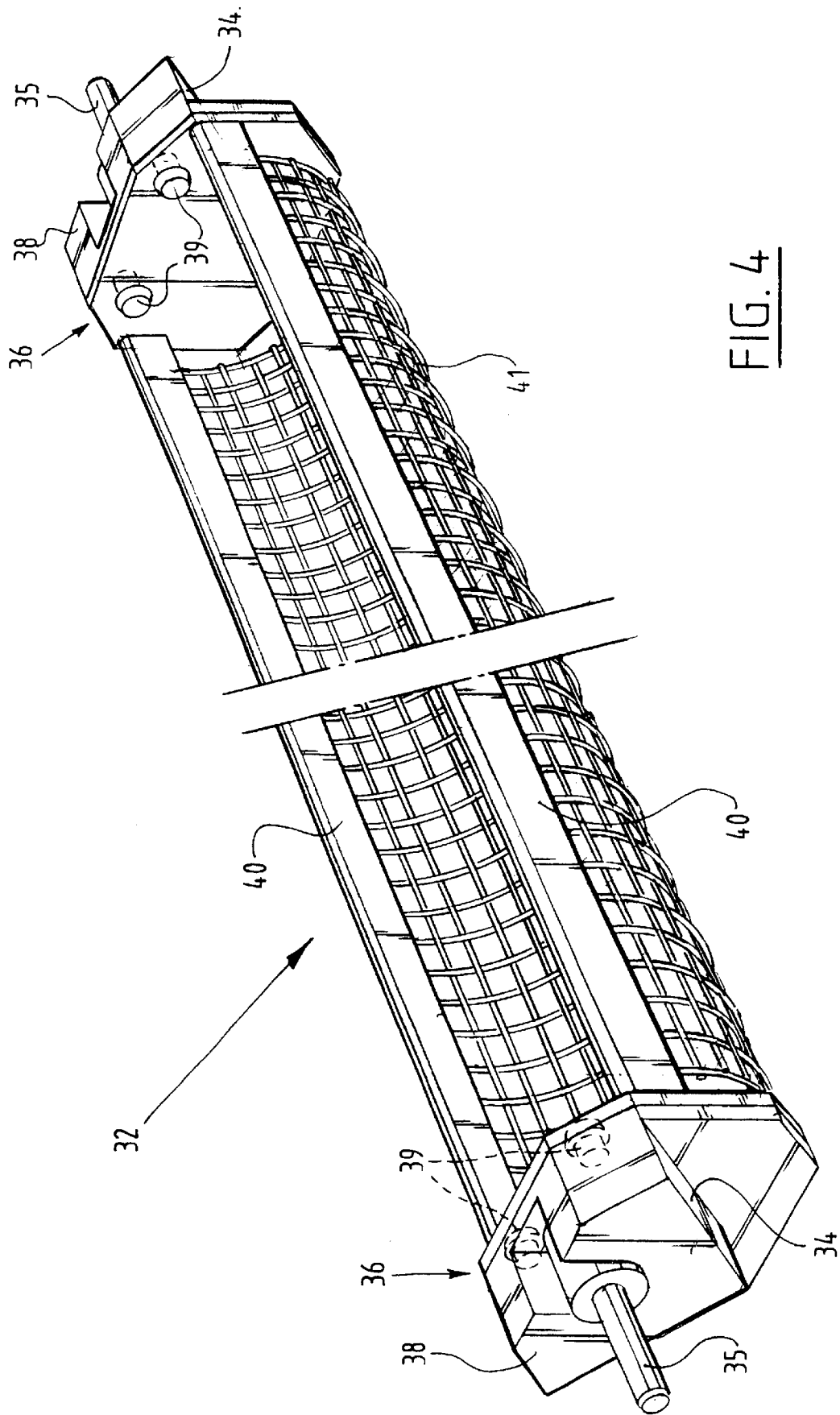
FIG. 4 shows a perspective view of a basket according to the invention.

FIG. 4 shows a carrier in its entirety. Carrier 32 comprises two side walls 36 which are manufactured from metal, for instance stainless steel, and which are provided on their outside with fitting pieces 38 which are formed by plates and which are connected by pins 39 to the actual side wall 36. Fitting plates 38 are provided with protrusions, thus forming recesses 34. In the present embodiment two recesses 34 of each side wall extend at an angle of about 90° relative to each other. It is however possible to apply other configurations of recesses, for instance two recesses extending at a different angle or a larger number of recesses.

The pins 35 are further fixed to the actual side walls 36. Both side walls 36 are mutually connected by containers 40 which are bent into a U-shape and which are likewise preferably manufactured from stainless steel. It is otherwise also possible to manufacture these from plastic. Both U-shaped containers 40 are connected by a basket 41 of wire mesh. Wire mesh 41 is preferably formed, as shown in the drawing, by woven wire mesh. It is otherwise possible to make use of punched wire mesh. The wire mesh is preferably manufactured from material which does not have a very high thermal conduction. Thus is prevented that when it remains for a long period in a space with a high temperature the wire mesh takes on this temperature and causes burning phenomena in the product situated in the basket. The basket shape has the further advantage that the product is easily accessible from all sides for radiation acting on the product or gases exerting an effect on the product.

As already stated in the preamble, this effect is improved by occasional tilting of the basket as a result of the action of the guide means.

Figure 5:
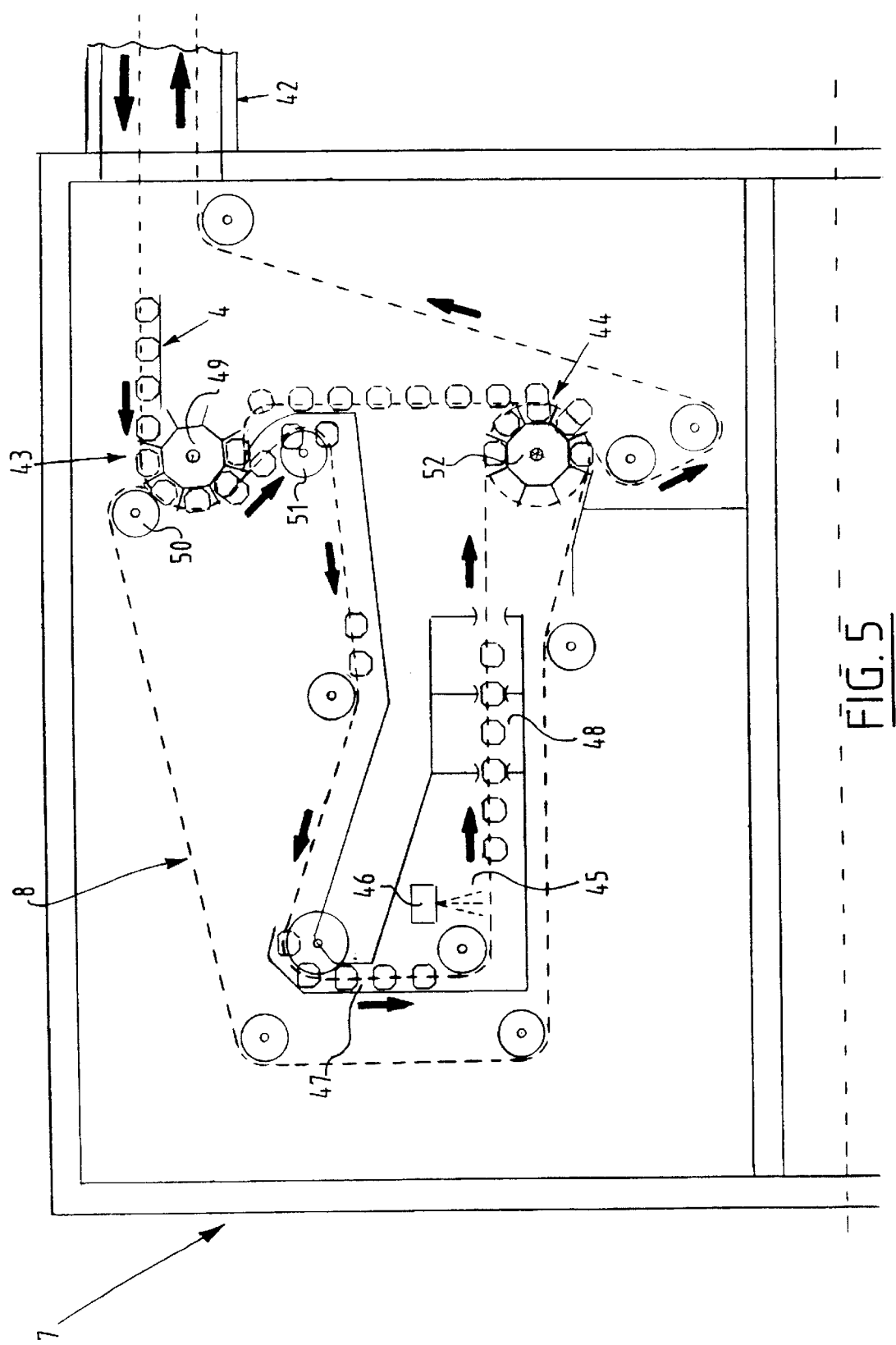
FIG. 5 shows a view in longitudinal section of the sub-device indicated with V in FIG. 1.

Further, reference is made to FIG. 5. Shown in FIG. 5 is the construction of the third processing housing 7. It can be seen herein that the third processing housing 7 is connected by means of a tunnel 42 to the second processing housing 6 shown in FIG. 1 but not in FIG. 5.

The first main transporting device 4 is guided via a first transfer device 43 which is connected to the second transporting device 8. The transfer device provides transfer of the content of the baskets of main transporting device 4 to the baskets of auxiliary transporting device 8. The transporting devices are otherwise both of substantially the same construction, wherein it is pointed out that the auxiliary transporting device, because of the fact that it is exposed to a more aggressive environment, is possibly manufactured from materials which better withstand this environment.

The main transporting device is subsequently guided along a second transfer device 44 which is adapted to transfer the content of the relevant carriers from the auxiliary transporting device to the main transporting device.

The auxiliary transporting device 8 leads through a chamber 45 and is adapted to spray the content of the carriers with smoke liquid. A spray device 46 is arranged for this purpose. It is equally possible for this purpose to make use of immersing devices or vapour supply devices.

In order to reach chamber 45 the auxiliary transporting device 8 moves through a tunnel 47, the width of which is slightly greater than the width of the carriers and the length of which as measured in the direction of the transporting device is greater than the distance between the carriers. Discharge of the carriers out of chamber 45 by the transporting device also takes place with a similar, sluice-like construction 48.

As stated, the first transfer device 43 comprises a guide wheel 49 for guiding each of the carriers. This guide wheel here fulfils the function of the fixedly arranged guide means. Due to the placing of the guide wheels 50 and 51 for guiding the chain of the auxiliary transporting device, the carriers or baskets forming part of the auxiliary transporting device are pressed against the carriers of the main transporting device, wherein by changing the angle of the combination the product present in the carriers of the main transporting device is transferred to the other container.

A similar, though reverse movement takes place at the second transfer device 44. The actual guide wheel 52 is herein placed close to the auxiliary transporting device.

It is thus possible to apply a separate auxiliary transporting device which is not exposed to the aggressive environment in chamber 45. It is of course possible to eliminate the effectiveness of this chamber by moving to the left the assembly of the auxiliary transporting device in accordance with an embodiment not shown in the drawing. This auxiliary transporting device is replaced by a guide plate in order to prevent the products falling out of the carriers of the main transporting device.

Figure 6:
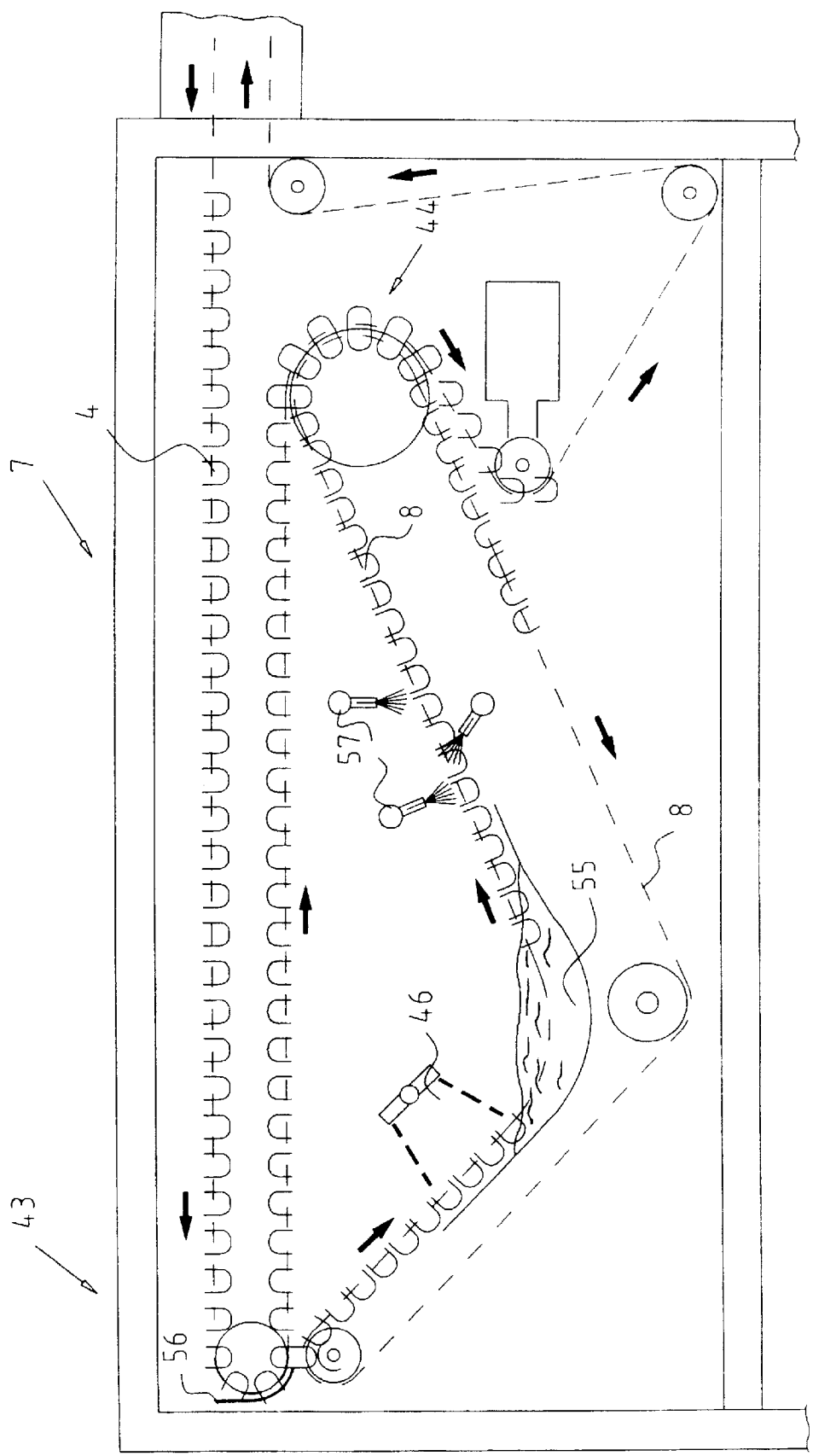
FIG. 6 shows a view similar to FIG. 5 of a variation of the partial apparatus depicted in FIG. 5.

FIG. 6 shows a variation of the smoke apparatus depicted in FIG. 5. Herein use is made of a plunging apparatus 55 beside of a spraying apparatus 46. To avoid making the auxiliary transporting device unnecessary long, both transfer devices are located at about the same level.

As a consequence thereof, they are differently constructed than the transfer devices in the preceding embodiment. In the first transfer device 43 the carriers 32 of the main transport apparatus come only in co-operation with the carriers of the auxiliary transport apparatus 8, when they have been tilted over an angle of 180°. To avoid that the contents of the carriers drop during the tilting a guide plate 56 has been provided. At the end of the guide plate the contents of the carriers drop into the carriers of the auxiliary transport device 8. Subsequently, the contents are sprayed with smoke liquid by the spraying apparatus 46 and the contents are thereafter plunged in the smoke liquid. The apparatus comprises a number of blowers 57 blowing off extra adhering smoke liquid from the products.

In the second transfer apparatus 54 the contents of the carriers of the auxiliary transport apparatus is fed back to the carriers of the main transport apparatus 4. It is noted that to maintain a synchronous movement between both transport apparatuses, the speed of the auxiliary transport apparatus should be smaller than that of the main transport apparatus with respect to the smaller radius.

Further, it is noted that the shape of the path of the auxiliary transport apparatus is such, that it is also possible to connect the carriers rigidly with the chain of the auxiliary transport apparatus.

Figure 7:
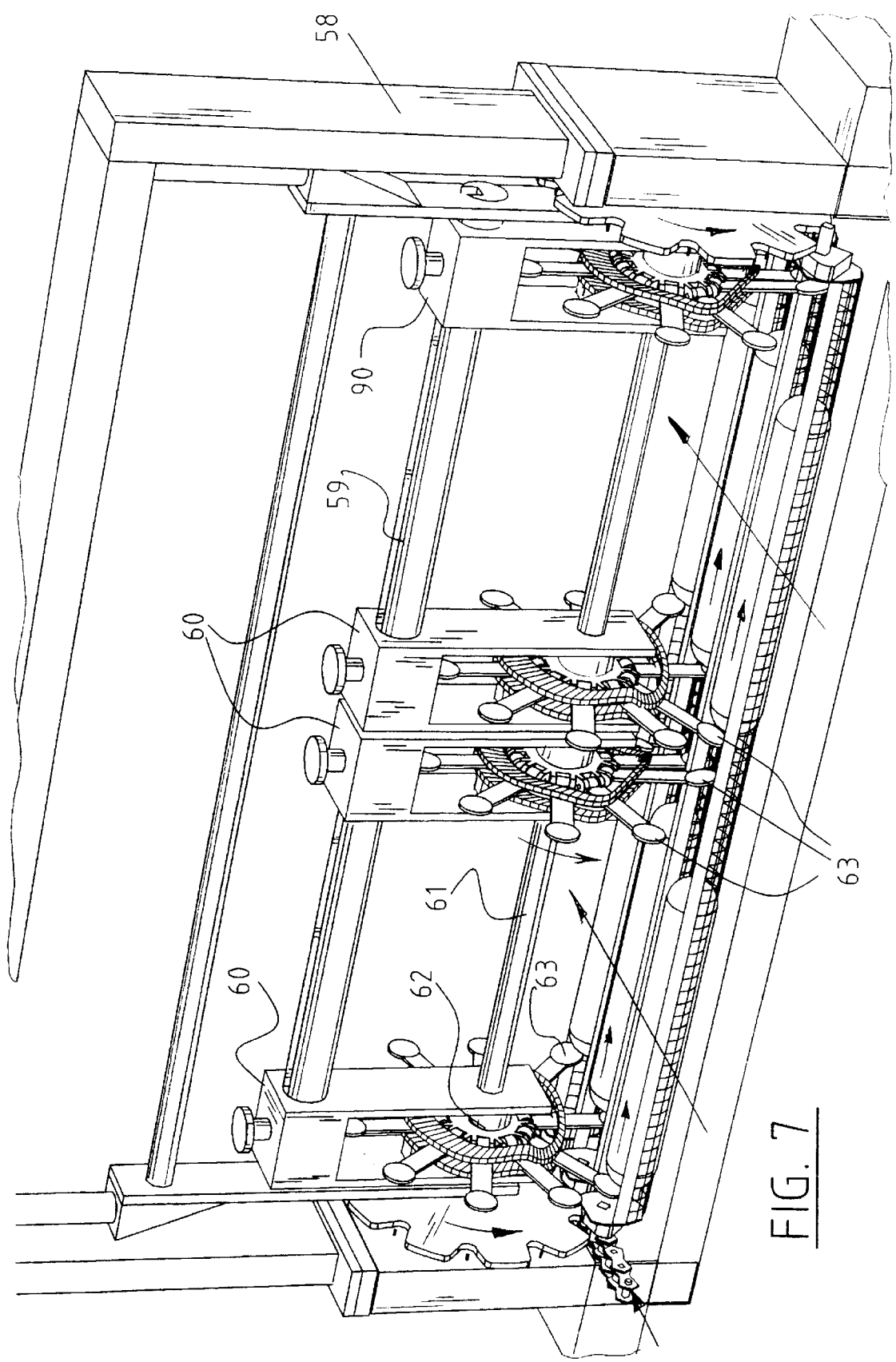
FIG. 7 shows a perspective view of a positioning apparatus.

In FIG. 7 a positioning apparatus has been depicted, which is used for arranging the products to be processed, like sausages on a defined position in the carriers. For a number of processes to be executed to the products it is of importance that the process is used for the correct part of the product, like the bending of a sausage to horse-shoe shape.

The positioning apparatus can be located between the processing housings 6,9 in the configuration depicted in FIG. 1, which housings serve as a drying housing, respectively a steam cook housing, and the latter is preferably integrated in the smoking apparatus arranged between those housings which is described with the help of the FIGS. 5 and 6. It is the most simple, when the position apparatus acts on a substantially horizontal part of the transport apparatus. The positioning apparatus comprises essentially a frame 58, extending like a bridge over the transporting device 4. In the frame 58 a carrier 59 has been provided which is adjustable in height along the frame. Four U-shaped holders 60 have been provided to the carrier 59, within which a shaft 61 is journalled rotatably. Within each of the holders 60 a hub 62 has been provided which comprises at its circumference a number radially extending brackets 63.

The shaft 61 is driven in rotation, so that the brackets 63 move along with the carriers 59. They have such a length, that they extend over a part of the path of the carriers until into the carriers. During this part of the path the brackets execute a movement towards the center of the carriers by means of a curve control from the outer side of the carriers, which is illustrated in three subsequent stages depicted from under to above in FIG. 7. During this movement, the subsequent products are shifted to the middle of the transporting devices 4.

Figure 8:
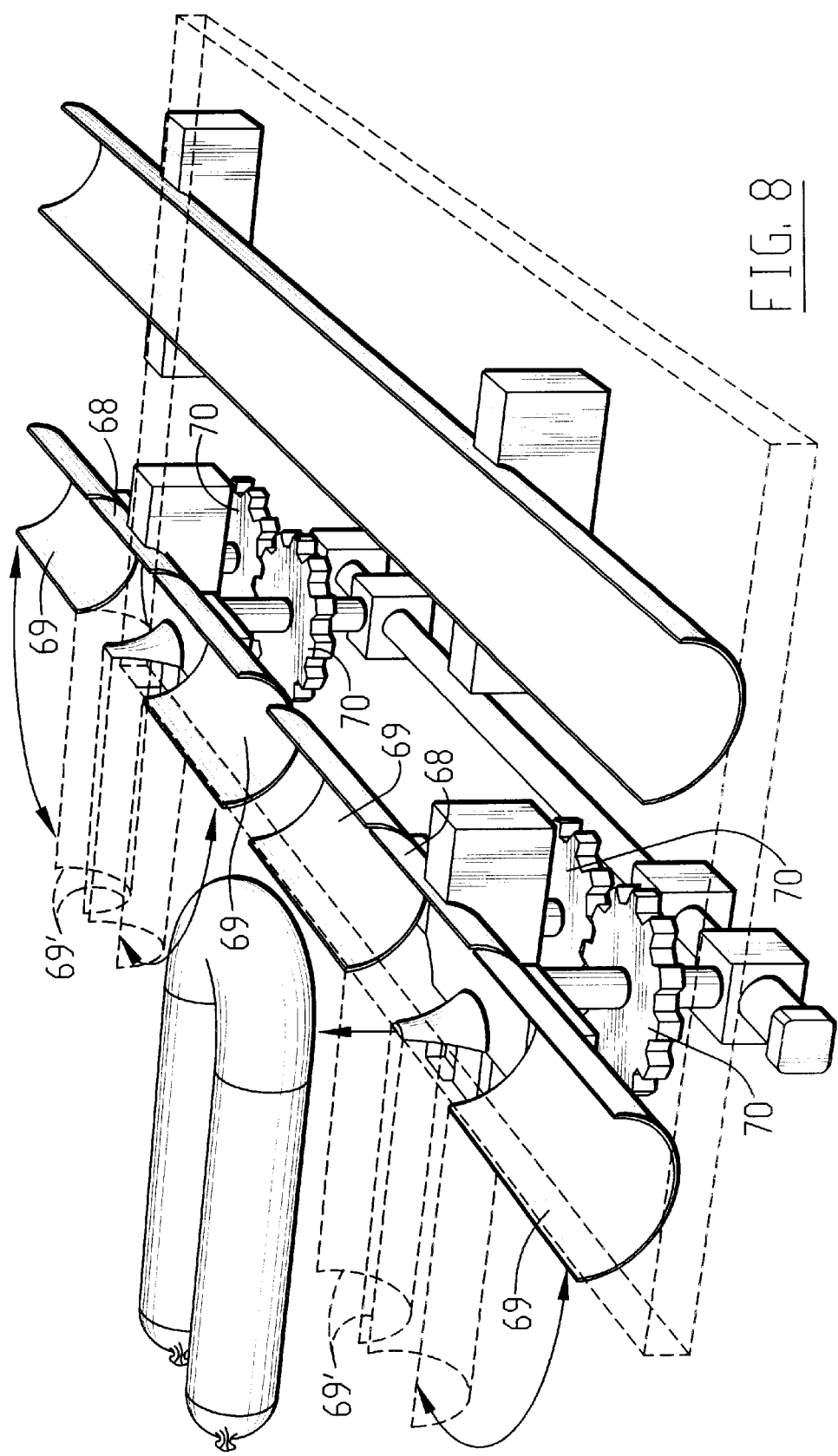
FIG. 8 shows a perspective view of a bending apparatus.

In FIG. 8 a bending apparatus for the bending of products, in particular of sausages, is depicted. Such a bending device is for instance arranged between the positioning apparatus depicted in FIG. 7 and the subsequent drying device. It is of importance that the sausages are in an easy bendable condition, in particular the skin of the sausages.

Generally, the bending device comprises a drum 66, unto which a number of bending units 67 has been arranged. It is, however, also possible to locate the bending units on another kind of carrier. By means of a transfer device not depicted in the drawings the sausages or other products are supplied to the bending units 67 located on the drum 66.

Each bending unit comprises two engaging elements 68, which have been arranged on the drum by means of a crank-driving shaft mechanism. By locating the sausages in gripping elements extending in each others prolongation, and by making subsequently both engaging elements rotate, the bending action is executed.

Herein the driving of the movable engaging element is dependent on the position of the drum 66.

Of course the sausages to be bended are supplied to the substantially horizontal part of the drum 66. During the further rotation of the drum 66 it is avoided that the sausages drop too early from the bending units by means of a guide not shown, which is located at the outer side of and concentric with the drum, and which preferably moves along with the drum.

Below the drum the sausages are taken over by a next transporter. Herein the drum has been dimensioned such, that the sausages have been bent to the correct shape.

During rotation of the drum the subsequent bending units 67 move subsequently and not repeatingly in the direction of one end of the drum and in the direction of the other end of the drum, such that the sausages are located compactly in six rows on the next transporter, which can be provided of standing up rims extending in the direction of transport. By such a compact transport efficient after-drying can be obtained.

Further, the drum comprises a transport unit 71 for each drum, which is used, when straight sausages should be produced. Herein the bending units are not acting. The choice between the bending units or the transport units is determined by the synchronisation between the transport apparatus and the rotation of the drum; by rotating the drum over a distance between the bending unit and the transport unit, it is possible to make a choice.

Figure 9:
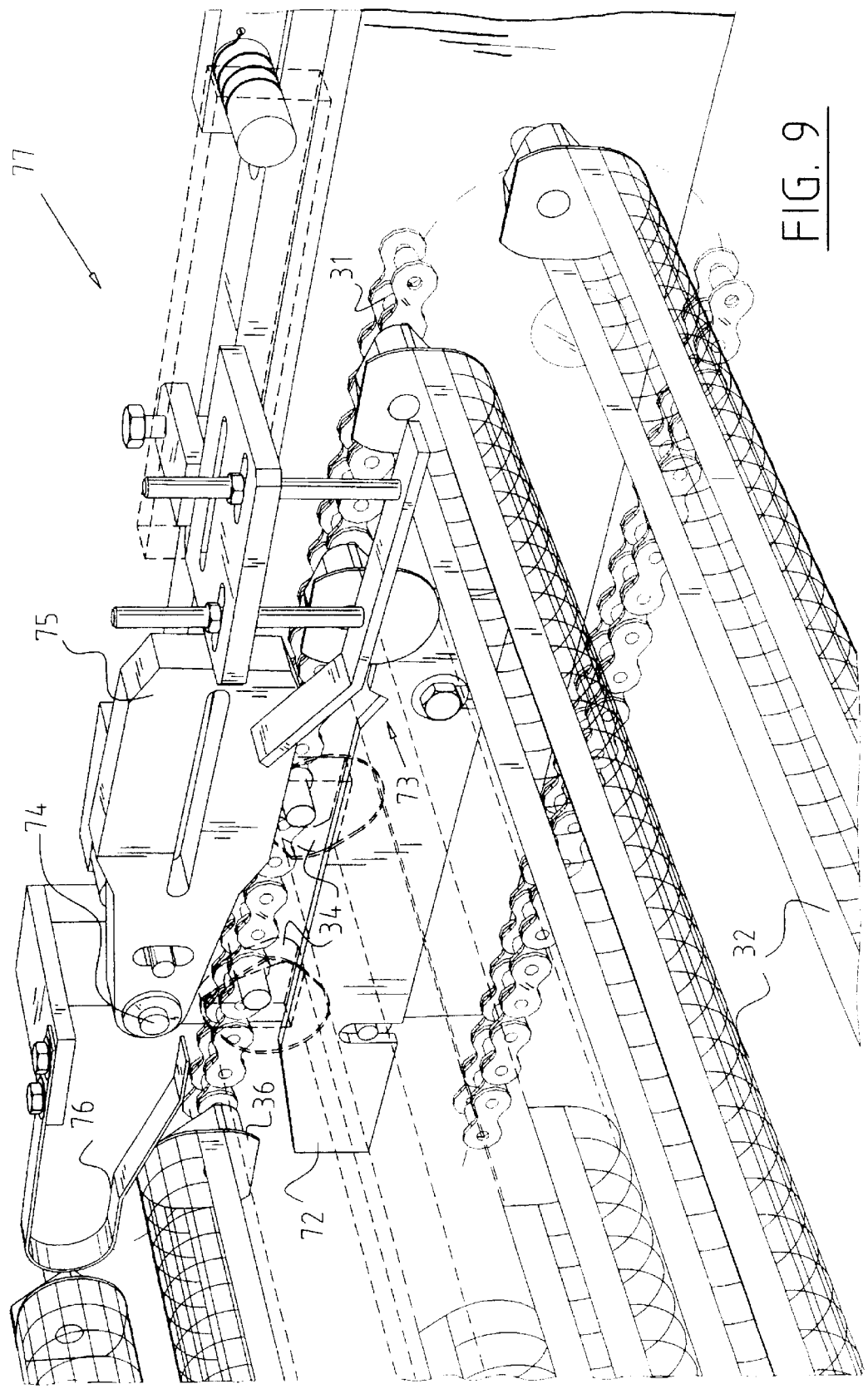
FIG. 9 shows a perspective view of a drying basket-positioning apparatus.

In FIG. 9 an alignment apparatus for the carriers has been depicted, which has been generally designated with 77. This alignment apparatus serves to bring the carriers 32 in a defined rotation position. The alignment apparatus can be inserted in the apparatus depicted in FIG. 1 in any required position. The alignment apparatus comprises a lower guide rail 72, in which an indent 73 has been provided. At the upper side the alignment apparatus comprises a weight 75 connected rotatably to a shaft 74. Both the weight 75 and the lower guide rail 72 are located close to the guide edges 34 connected to the carriers 32. In the normal situation, that is to say, when the carriers 32 are in the position as depicted in FIG. 9, the transport of the chain 31 moves the relevant carrier and the guide edge 34 over the indent 73. By the force extended by the weight the carrier tilts backwardly in a slight amount, so that there is no risk that the front guide edge 34 engages the indent 73 leading to an unadvertent tilting of the carrier. When, however, one of the carriers is transported in a front-to-back position, the weight 75 will press the sharp edge of the guide edge 34 until the indent 73, so that this guide rim 34 is stopped at its lower side, and will execute a rotation until the carrier is in its correct position.

It is, however, also possible that a carrier is supplied in a complete upsidedown position. For such a situation a guiding 76 has been provided engaging the side wall 36 of the carriers, which are supplied in the fully turned upsidedown position. In the present embodiment the side wall 36 has the contour of the carrier. The guiding has been provided in the path of the plate, in which the guiding exerts such a force to this counter plate, that the carrier tilts and comes in the correct or in the upsidedown position. When the carrier arives in the upsidedown position, it will turn again at the indent 73.

It will be apparent that the scope of protection of the present invention is limited only by the claims and not by the embodiment shown above.

What is claimed is:

1. Transporting device for transporting food products to be subjected to a process, comprising:
   a. at least one advancing element located along a route extending through a first processing station;
   b. at least one carrier for the food products fixed to the advancing element, wherein the carrier comprises mesh for supporting the food products; and
   c. primary guide means for guiding the carriers along at least a part of the route.

2. Transporting device of claim 1, wherein the route and the advancing element each form a closed path.

3. Transporting device of claim 1, wherein the route is linear and the advancing element is adapted to transport the carrier alternatingly in opposing directions.

4. Transporting device of claim 1, wherein the guide means are adapted to bear at least a part of the weight of the carrier.

5. Transporting device of claim 1, wherein the carrier is mounted rotatably on the advancing element.

6. Transporting device of claim 5, wherein the primary guide means are adapted to determine the rotation position of the carrier.

7. Transporting device of claim 5, wherein the transporting device comprises an alignment apparatus for making the carrier move towards a defined rotation position of the carrier.

8. Transporting device of claim 1, wherein the advancing element comprises at least one spring belt.

9. Transporting device of claim 5, wherein the advancing element comprises at least one chain provided with hollow links and the carrier is provided with a protrusion extending into a hollow link.

10. Transporting device of claim 1, wherein the carrier further comprises at least one substantially closed side wall.

11. Transporting device for transporting food products to be subjected to a process, comprising:
   a. at least one advancing element located along a route extending through a first processing station;
   b. at least one carrier for the food products fixed to the advancing element; and
   c. primary guide means for guiding the carriers along at least a part of the route, wherein the route extends through at least a second processing station, the first and second processing stations being connected by a tunnel, the length of the tunnel being at least as long as the maximum distance between two carriers fixed to the advancing element, and the width of the tunnel being less than 1.5 times the width of the carriers.

12. Transporting device for transporting food products to be subjected to a process, comprising:
   a. at least one advancing element located along a route extending through a first processing station;
   b. at least one carrier for the food products fixed to the advancing element; and
   c. primary guide means for guiding the carriers along at least a part of the route, wherein the primary guide means comprises guide elements located on the carrier and guide supports, wherein the guide elements guide the carrier into a position determined by the guide supports.

13. Transporting device of claim 12, wherein the guide supports are displaceable for changing the position of the carrier.

14. Transporting device of claim 12, wherein the carrier comprises mesh for supporting the food products.

15. Transporting device of claim 14, wherein the guide elements are arranged on the outside of the carrier.

16. Transporting device of claim 12, wherein the mesh is manufactured with a passage ratio greater than 65%.

17. Transporting device of claim 12, wherein the mesh is woven.

18. Transporting device of claim 1, wherein the mesh is manufactured from a material with a thermal conduction coefficient of a maximum of 0.25 W K$^{-1}$ m$^{-1}$.

19. Transporting device of claim 1, wherein the mesh is plastic.

20. Transporting device of claim 14, wherein the carrier further comprises containers located along the top edges of the carrier for receiving the mesh.

21. Transporting device of claim 20, wherein the containers are releasably connected to the guide elements.

22. Transporting device of claim 12, wherein the guide elements comprise plastic.

23. Composite transporting apparatus comprising a first and a second transporting device for transporting food products for processing, wherein the transporting devices are coupled by a transfer device and each transporting device comprises:
   a. at least one advancing element located along a route extending through a first processing station;
   b. at least one carrier for the food products fixed to the advancing element; and
   c. primary guide means for guiding the carriers along at least a part of the route;
      wherein the transfer device is located at a junction where the routes of the transporting devices converge along a parallel path and the guide means position the carriers along the parallel path so that the content of the carrier of the first transporting device is transferred to the carrier of the second transporting device.

24. Composite transporting apparatus of claim 23, wherein the parallel path extends in an arc.

25. Composite transporting apparatus comprising a first and a second transporting device for transporting food products for processing, wherein the transporting devices are coupled by a transfer device and each transporting device comprises:
   a. at least one advancing element located along a route extending through a first processing station;
   b. at least one carrier for the food products fixed to the advancing element; and
   c. primary guide means for guiding the carriers along at least a part of the route;
      wherein a first transfer device transfers the food products from the first transporting device to the second transporting device, and a second transfer device transfers the food products from the second transporting device to the first transporting device.

* * * * *

UNITED STATES PATENT AND TRADEMARK OFFICE
CERTIFICATE OF CORRECTION

| | |
|---|---|
| PATENT NO. | : 6,471,042 B1 |
| DATED | : October 29, 2002 |
| INVENTOR(S) | : Wilhelmus Johannes Everardus Maria Van De Dugen et al. |

It is certified that error appears in the above-identified patent and that said Letters Patent is hereby corrected as shown below:

<u>Column 13,</u>
Lines 43 and 45, strike the numeral "12" and insert the numeral -- 1 --.

Signed and Sealed this

Eleventh Day of February, 2003

JAMES E. ROGAN
*Director of the United States Patent and Trademark Office*